UNITED STATES PATENT OFFICE.

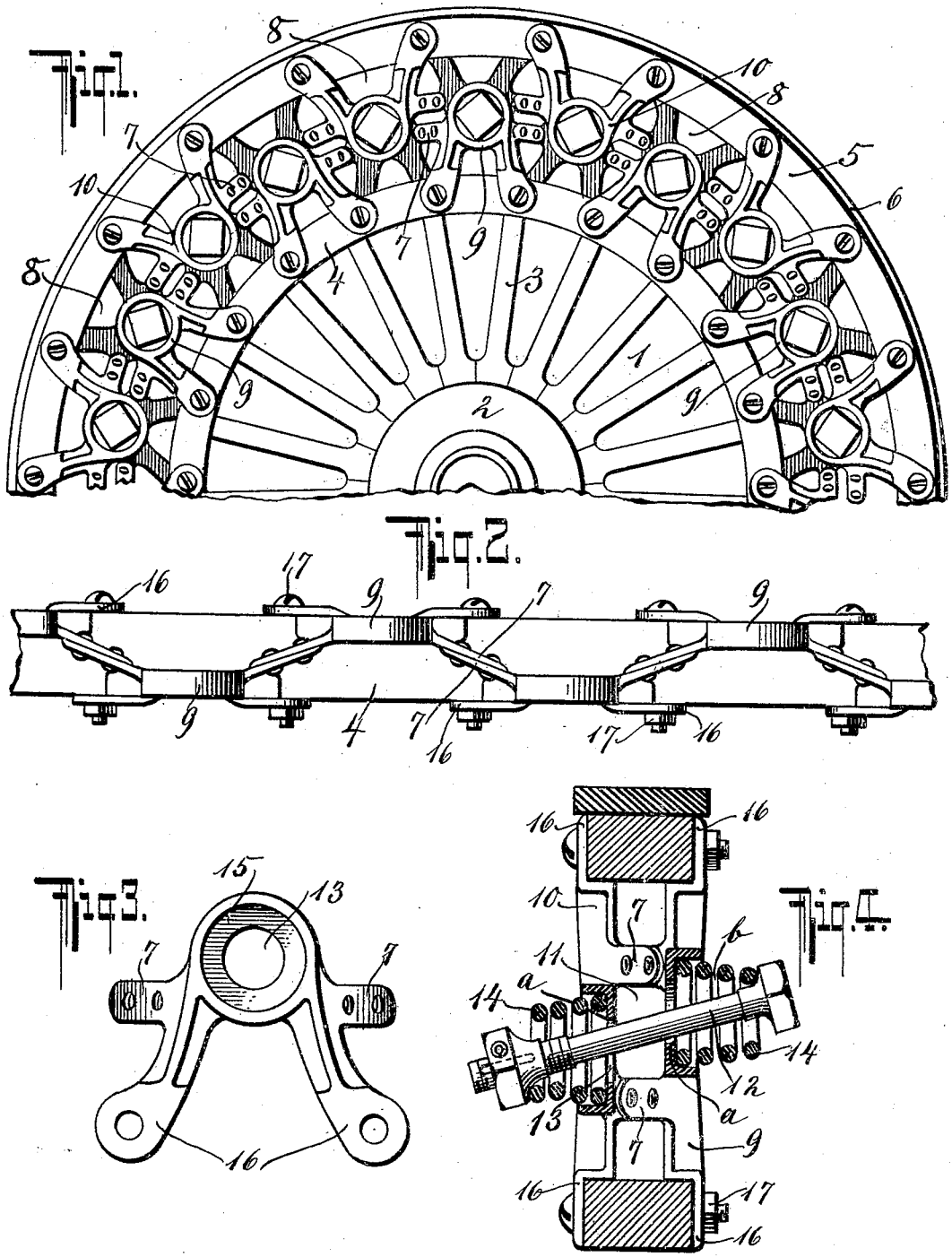

PETER M. KLING, OF McKEES ROCKS, PENNSYLVANIA.

SPRING-WHEEL.

954,523.  Specification of Letters Patent.  Patented Apr. 12, 1910.

Application filed January 18, 1908. Serial No. 411,545.

*To all whom it may concern:*

Be it known that I, PETER M. KLING, a citizen of the United States, and resident of McKees Rocks, county of Allegheny, and State of Pennsylvania, have invented certain new and useful Improvements in Spring-Wheels, of which the following is a specification.

My invention has for its object the production of a spring wheel for vehicles having the advantages of a cushion without the need of a pneumatic tire.

My wheel will furnish resiliency, cushioning the blows before the jolt reaches the axle. It will afford a substitute for the expensive and dangerous pneumatic tire as my wheel cannot explode or be punctured. It will also be more economical in operating and maintaining by reason of its novel construction and by reason of the materials used in the construction. With its simplicity it will furnish the same resiliency and easy riding qualities that a wheel has with the pneumatic or cushion tire. On my wheel a solid tire can be used, as the cushioning and soft riding is accomplished between the inner and outer rims through the connections.

My improved structure is of the type of a wheel consisting of inner and outer rims and is so constructed as to cushion itself between these inner and outer rims and not on the tire, and comprises as its main elements: first: transversely arranged bolts parallel with the axle, which take the main strain, second: compression springs or cushions, third: brackets suitably disposed on each rim forming a support for the intermediate cushioning elements, the brackets of each rim being connected with each other so as to support each other, which arrangement enables me to produce a light and still strong structure.

I have illustrated in the accompanying drawings a particular form of spring wheel and cushioning element, the various other forms which may be used to the same advantage being shown in a copending application Ser. No. 330,717, filed August 15, 1906.

In said drawings: Figure 1 is a side elevation of one-half of my improved wheel having my improved construction and design applied; Fig. 2 is a plan view of a portion of the inner rim showing the alternating arrangement of the brackets; Fig. 3 is a detail view of a bracket in enlarged scale; and Fig. 4 is a transverse section through the inner and outer rims showing the same in operative position.

The body or hub portion of the wheel is shown at 1 comprising a hub 2, spokes 3 and felly 4. These parts I will refer to as the inner rim, and its construction may be that shown, or any preferred form. The outer rim consists of the felly 5 and a suitable tire 6, preferably made of steel or rubber or both fixed to the felly 5 in any preferred manner. The resilient supporting member is arranged in the space 8 between the inner and outer rims and is constructed as follows:

9—9 (Figs. 1, 2 and 4) are a series of brackets or spring supports fixed as shown in Figs. 1 and 2, alternately on opposite sides of the inner rim, while 10—10 are similar brackets or spring supports fixed alternately on opposite sides of the outer rim. The brackets of each rim are provided with laterally extending ears or lugs 7 as shown in Fig. 3 which are bent at a suitable angle, so as to overlap the lug of the adjoining bracket of each side, as shown in Fig. 2, and so that the overlapping lugs of two adjoining brackets are in a suitable position to be riveted or screwed together. By these means it will be seen that the brackets of each rim can be made unusually light. Thus the row of brackets of each rim forms an annular structure which is suitably fastened to its rim by means of foot pieces 16, of which two are provided on each bracket (Fig. 3), and by bolts 17 (Fig. 2), preferably so that a bolt 17 passing through one foot 16 of a bracket on one side of the wheel will bind the corresponding foot of the adjoining bracket on the other side of this wheel. The brackets 9, 10 are so disposed that the bracket 9 on one side of the inner rim is arranged parallel to and opposite the bracket 10, arranged on the opposite side of the outer rim and each pair of brackets alternates in this relation around the wheel. The space 11 (Fig. 4) is a clearance between the brackets and can be made as small as practicable, as these can never be brought together as long as the bolts or spring brackets or spring cushions remain intact. The opposing brackets of the inner and outer rims are coupled together by bolts 12 which pass through openings 13 in said brackets and have resilient support on the outer sides of the brackets. The resilient means for supporting the bolt consists preferably of a spring 14 disposed in a recess 15 (Fig. 3) of each bracket and abutting with its outer end against the heads of the bolts 12 as shown in Fig. 4, which heads are for this purpose provided with a concaved shoulder to conform with the shape of the coil of the spring abutting against it and which have a loose fit in this coil. This shaping of the bolt heads is essential for the reason that while the wheel is in operation the bolts will perform a rolling motion, their heads thereby rolling upon the inside of their abutting spring coils so that if the bolt heads were not suitably shaped to facilitate this rolling motion unnecessary friction and also distortion of the spring coils might be caused. Furthermore one of these bolt heads is adjustably disposed upon bolt 12 so that the wear caused by the rolling motion and also the loss of tension of the springs caused by the operation of the wheel in course of time may be easily taken up.

The abutting of the springs against the heads of the bolts results in a very prompt and effective compression of the springs. Should the wheel become overloaded the brackets on the inner and outer rim members will be forced in opposite directions and will meet the bolts at the points marked *a* (Fig. 4) and thus practically form a solid or rigid wheel resting on all the bolts in the wheel and no further harm can come to the wheel during the overloading, and as soon as the overload or strain is removed, the wheel will go back to its original position and resiliency. Another feature of practical utility is, that with the wheel in compression I can compress the springs to any degree even to the extent of completely closing the spaces *b* between the coils of the springs (Fig. 4), so as to eliminate the resiliency of the springs providing in effect a rigid or solid wheel to which no harm can come by an overload.

The safeguards which I thus provide against the cushioning and wrecking of the wheel by overloading constitute valuable features of superiority of my invention.

While I have described and shown the several general features comprising my new spring wheel, to make clear my invention, the particular feature of this application which I desire to have protected by Letters Patent, is the mutual support of the spring brackets of each rim so as to provide a light but strong structure, and the particular shape and adjustability of the bolt heads the other features of my wheel being claimed in a copending application.

I claim:

1. In a structure of the character described, the combination of inner and outer rims, brackets alternately arranged on opposite sides of such members, bolts connecting said brackets, yieldingly supported thereby and disposed to have freedom of radial and horizontal movement and means connecting the brackets of each of said members causing said brackets to support each other.

2. In a structure of the character described, the combination of inner and outer rims, brackets alternately arranged on opposite sides of such members, bolts and compression springs connecting such brackets, the bolts being arranged to have freedom of radial and horizontal movement and means connecting the brackets of each of said members, causing said brackets to support each other.

3. A wheel consisting of concentric inner and outer members having paired overlapping brackets projecting from the outer periphery of the inner member and the inner periphery of the outer member in combination with compression springs and confining rods tending to press together the two overlapping brackets of each pair, the outwardly projecting brackets of the inner wheel member and the inwardly projecting brackets of the outer wheel member being each arranged alternately in two oppositely presented series, whereby the tendency of the springs to press together the members of each pair of brackets is resisted by the similar tendency exerted on the brackets of adjacent pairs, and means connecting the brackets of each of said members to cause said brackets to support each other.

4. In a structure of the character described, the combination of inner and outer rims, brackets alternately arranged on opposite sides of such members, bolts connecting said brackets, yieldingly supported thereby and disposed to have freedom of radial and horizontal movements, each of said brackets of either member having lugs on each side disposed to overlap and be secured to the corresponding lug of the bracket on either side of it, causing the brackets of each wheel member to support each other.

5. In a structure of the character described, the combination of inner and outer rims, brackets alternately arranged on opposite sides of such members, bolts and compression springs connecting such brackets, the bolts being arranged to have freedom of radial and horizontal movements, each of said brackets of either member having lugs on each side disposed to overlap and be secured to the corresponding lug of the bracket on either side of it, causing the brackets of each wheel member to support each other.

6. A wheel consisting of concentric inner and outer members having paired overlapping brackets projecting from the outer periphery of the inner member and the inner periphery of the outer member in combination with compression springs and confining rods tending to press together the two overlapping brackets of each pair, the outwardly projecting brackets of the inner wheel member and the inwardly projecting brackets of the outer wheel member being each arranged alternately in two oppositely presented series, whereby the tendency of the springs to press together the members of each pair of brackets is resisted by the similar tendency exerted on the brackets of adjacent pairs, each of the brackets of either member having lugs on each side disposed to overlap and be secured to the corresponding lug of the bracket on either side of it, causing the brackets of each wheel member to support each other.

7. In a structure of the character described, the combination of inner and outer rims, brackets alternately arranged on opposite sides of such members, suspension means connecting such alternate brackets and supported thereby, and cross-connections between the brackets of each member for their mutual support.

8. In a structure of the character described, the combination of inner and outer rims, brackets alternately arranged on opposite sides of such members, suspension means yieldingly connecting such alternate brackets and supported thereby, and cross-connections between the brackets of each member for their mutual support.

PETER M. KLING.

Witnesses:
 HARRY E. KNIGHT,
 G. L. GRIFFIS.